United States Patent [19]
Becher

[11] Patent Number: 6,141,945
[45] Date of Patent: Nov. 7, 2000

[54] MULTI-UNIT AUTOMATIC COMPACTING, PACKAGING, AND DISPOSAL MACHINE FOR PLURAL MATERIALS

[76] Inventor: Yona Becher, P.O. Box 461, Denville, N.J. 07869

[21] Appl. No.: 09/174,793

[22] Filed: Oct. 19, 1998

[51] Int. Cl.[7] ............................... B65B 1/24; B30B 15/62
[52] U.S. Cl. ......................... 53/527; 100/915; 100/221; 100/229 A; 53/529
[58] Field of Search ............................... 100/221, 229 A, 100/232, 286, 272, 193, 290, 915, 218; 53/527, 373.4, 373.7, 374.8, 529

[56] References Cited

U.S. PATENT DOCUMENTS

| | | | |
|---|---|---|---|
| 413,271 | 10/1889 | Wilson | 100/286 |
| 3,916,782 | 11/1975 | Booton | 100/229 A |
| 4,011,810 | 3/1977 | Santic | 100/290 |
| 4,241,562 | 12/1980 | Smedlund | 53/438 |
| 4,275,651 | 6/1981 | Geroth et al. | 100/229 A |
| 4,620,479 | 11/1986 | Diamond | 100/229 A |
| 4,638,730 | 1/1987 | Bonacorsi | 53/527 |
| 5,042,634 | 8/1991 | Gulmini | 194/209 |
| 5,048,903 | 9/1991 | Loblein | 312/234.1 |
| 5,072,833 | 12/1991 | Hansen et al. | 100/35 |
| 5,155,975 | 10/1992 | Knower | 53/527 |
| 5,259,304 | 11/1993 | Roberts | 53/527 |
| 5,447,017 | 9/1995 | Becher et al. | 53/527 |

*Primary Examiner*—Peter Vo
*Assistant Examiner*—Louis Huynh

[57] ABSTRACT

This present invention relates to a multi-unit, automatic machine for compaction, packaging, and disposal of plural types of material such as newspaper, plastic containers, glass bottles, aluminum cans, or other household and commercial waste. Each type of material is automatically processed in a separate unit and than separately packaged and sealed in a special bar coded bag, which is then disposed of the machine.

The automatic recycling machine is constructed as an appliance and includes housing with inlet for each material type where material is inserted to a specific unit. The material is crushed and compacted as a movable container is moved upwards towards a static container thus reducing the volume of the material between them. The actuation system consists of double scissors member mechanism and pneumatic actuator connected in between members of the mechanism, thus amplifying the travel of the actuator. Alternate actuator type consists of gearmotor with lead screw as output shaft, which convert rotary motion to linear motion using a drive nut. The material is compacted within a special type packaging means which is inserted through an opening in the back of the machine and into a special guided slot, in which it is supported during the process. When the bag is filled, it is automatically sealed by means of two parallel bars, which are moving towards each other by means of pneumatic actuators. A seal is created along their contact line where the parallel bars meet each other by means of electrical heating elements.

The package is then conveyed out of the machine as said movable container is moved upwards and the package is pushed down by said static container through a lower opening in said moveable container after that said opening covers are moved out by pneumatic actuators. The package is then conveyed out of the machine through a side cover of the housing by means of a conveyor. The control panel of the machine includes push buttons to override the automatic control of the compaction and package removal.

6 Claims, 10 Drawing Sheets

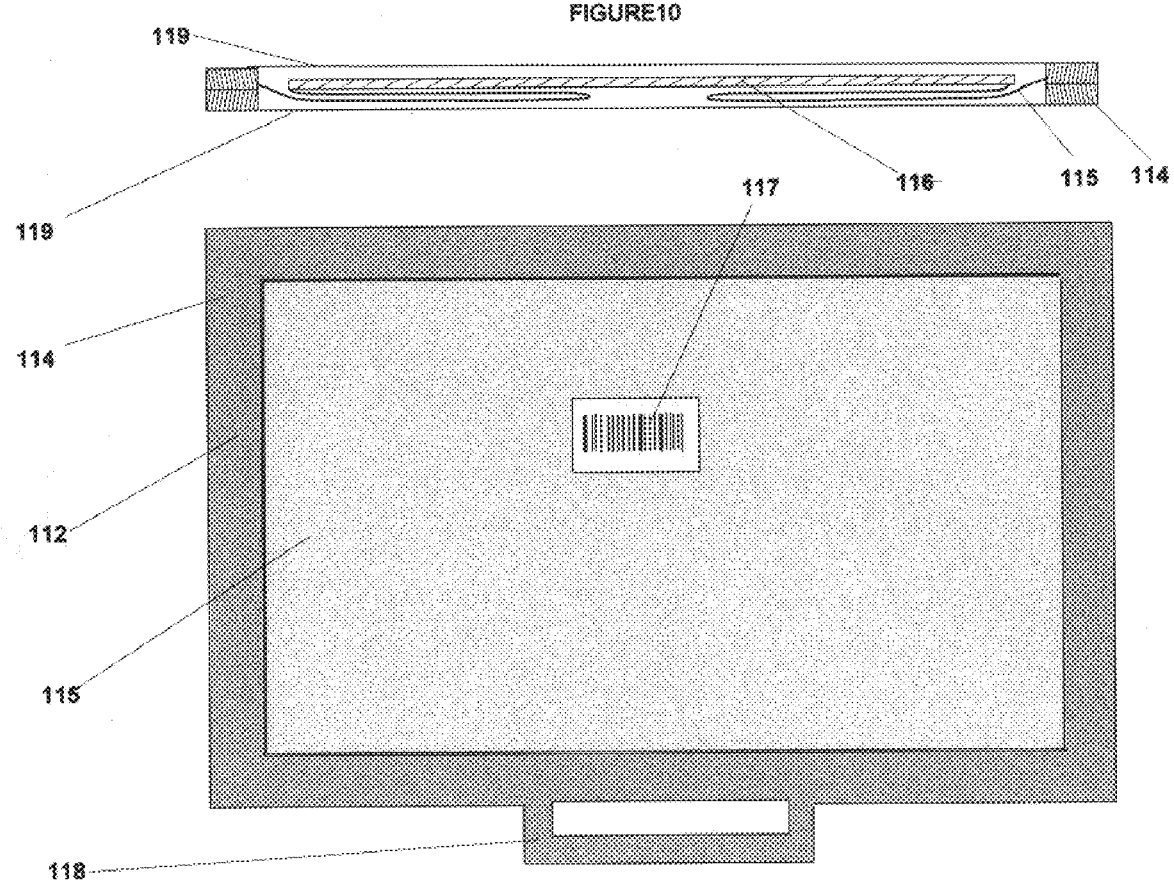

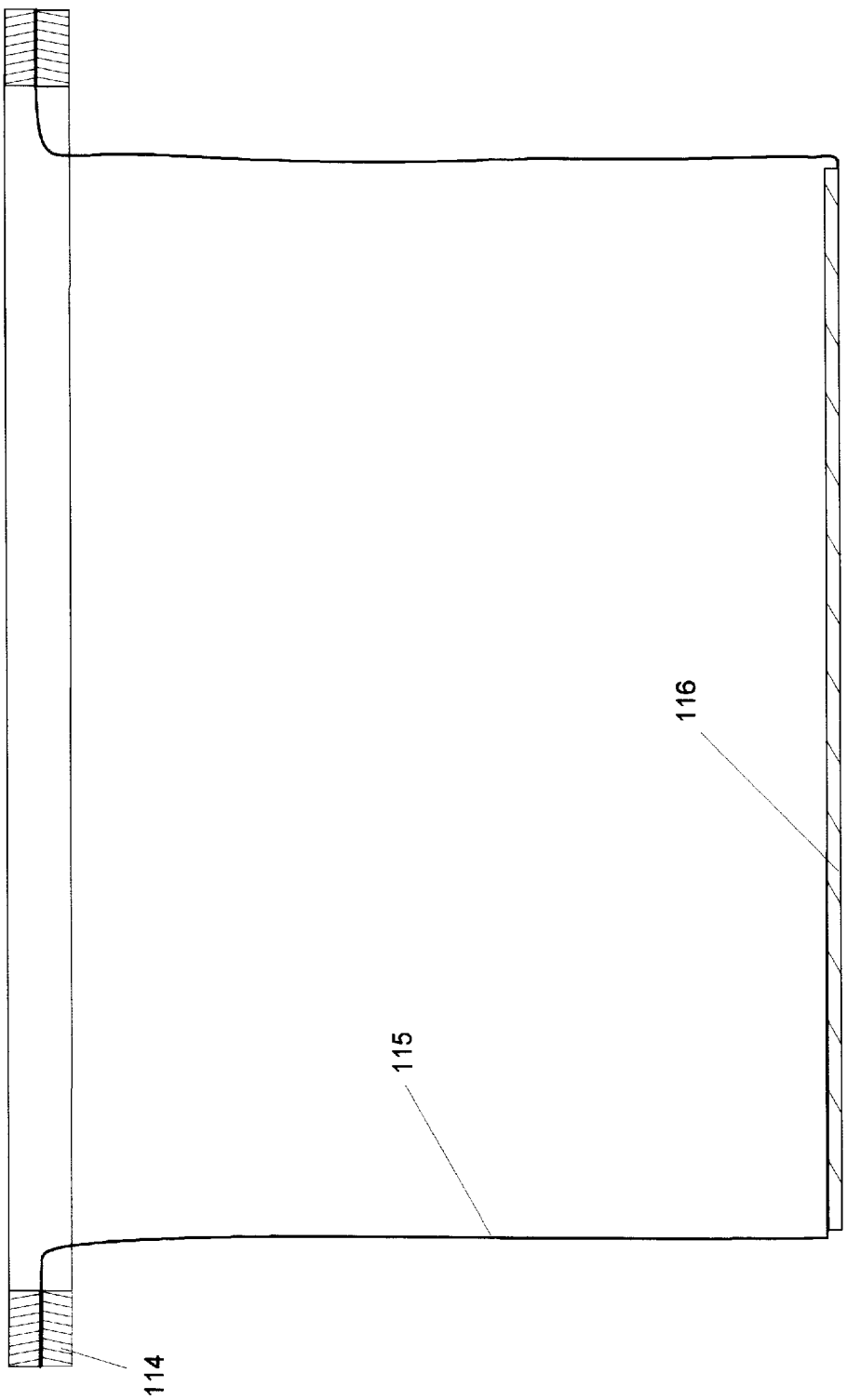

MULTI-UNIT AUTOMATIC COMPACTING, PACKAGING, AND DISPOSAL MACHINE FOR PLURAL MATERIALS

BACKGROUND OF THE INVENTION (A) Field of the Invention

As known, waste, refuse, trash and garbage is a critical problem for the world today. It covers almost every place on earth where people live and create waste material that is polluting the land, air, water, and environment.

Compaction and packaging waste materials help in the recycling and reusing of these materials and is the most effective, economical and healthy way of solving the waste disposal problem. Therefore, building automatic compaction and bagging machines will make recycling easier and more efficient and therefore very important to well being of our world.

(B) Description of Prior Art

Prior art, which related to recycling devices includes ways to improve and organize the waste collection and recycling duties and proposes several types of storage containers for helping with the sorting of the household waste materials. Other patents include means to mechanically reduce the volume of some waste containers such as aluminum cans with mechanical means of crushing plastic containers of certain shapes.

Few examples of the patent which are related to this prior art are: U.S. Pat. No. 5,072,833 to D. Hansen and P. F. Mahoney, No. 5,042,634 to C. Gulmini and No. 5,048,903 to E. Loblein.

Other prior art patents relates to compacting means for waste material.

U.S. Pat. No. 4,241,562 by Kurt H. Smedlund disclosed means to compact plural refuse receivers on an indexable support, by a power-operated movement programming mechanism which is controlled manually. Also, its mechanism for compacting multiple refuse receivers one after the other in a cyclic motion is not suitable for multiple types of waste, where usually only one receiver needs compacting at a time.

U.S. Pat. No. 4,620,479 by Fredrick L. Diamond provides special collapsible box in which the waste material is compacted by hydraulic ram. However, the compact operation and the removal of the filed bag is done manually and there is no sorting of the waste material.

U.S. Pat. No. 4,638,730 by Robert W. Bonacorsi disclosed means to remove the filled bag by a wheeled bin which is removed from the compactor housing and moved on the wheels to the site of waste disposal. However, the compact operation and the removal of the filed bag is done manually and there is no sorting of the waste material.

U.S. Pat. No. 4,275,651 by Hugh F. Groth and Guilbert M. Hunt disclosed compacting means, which include a ram driven by scissors-type actuator. The container is made of molded rigid plastic, which is attached to two-wheel cart for moving the container. However, the compact operation and the removal of the filed bag is done manually and there is no sorting of the waste material.

U.S. Pat. No. 5,155,975 by James T. Knower disclosed a ratable driven tooth shaft-rotor which mesh with static teeth located on anvil member is used to shred waste material and also compact it into the waste box. However, shredding operation and the removal of waste box with fork lift-type jack, may be more suitable for industrial waste rather then for household use. In addition, the waste material is not sealed inside housing and there is no sorting of the waste material.

U.S. Pat. No. 5,259,304 by Mark A. Roberts disclosed a Carousel Compactor for Multi Component Refuse. The specific waste containers are being turned to certain angular location for receiving new waste, for compacting and for removal of the filled bag. However, the control of all operations including introducing new waste, compacting, and removal of filled bag is done manually through microprocessor.

U.S. Pat. No. 5,447,017 by Yona Becher and Dan Lemieux provided solution to the sorting, compaction, packaging, sealing, and disposal of waste material.

However, the prior art has not provided yet an easy, low cost solution to the household and commercial waste recycling and collection task, which could be widely utilized by the public.

According to said prior art; the recycling the waste material handling still requires tedious and mostly manual effort every single day.

Even by utilizing the prior art techniques for recycling and reducing the volume of the waste, there is still no efficient way to help the public in the daily effort of coping with the new recent waste recycling laws, which were enforced in many states throughout the country.

Generally, the prior art has not solved the waste material recycling and disposal problems, in every household and business.

OBJECTS AND ADVANTAGES OF THE INVENTION

The objects of this invention is to provide an automatic multi waste materials types compaction, packaging and sealing machine with disposal means for household or business.

More particular object of the invention is to provide a novelty means of automatic multi-waste and recyclable material types compaction, packaging and sealing machine with disposal system for the household and commercial waste which is convenient, easy to use and maintain, odorless, safe, efficient and affordable. Also, a special designed packaging bag enables automation in the compaction, sealing, and disposal of the packaged material.

The recycling of waste materials in household and businesses has become important part of our daily life after that some strict laws in many states require the recycling of most of the waste material. Recycling by the law requires a daily effort from every citizen. The object of this invention is to improve waste recycling process by reducing its volume by compaction and crushing. In addition, it provides packaging and sealing means to avoid spillage and odor and then complete the operation by automatic disposal of the package from the machine. The automation of all these processes, helps to make the recycling process fast and comfortable routine in our everyday life.

Furthermore, The object of this invention is to provide each household and commercial facility with an affordable new appliance which is neat looking, clean and odorless which will replace the kitchen garbage container and the plural bags and plastic containers used for recyclable waste, by one automatic waste compacting and packaging machine for plural types of recyclable waste materials and non-recyclable waste.

In addition, the object of the automatic waste compaction machine is to improve the quality and thereby the value of the recyclable materials by crushing and compacting it so as to reduce the volume to a minimum, thereby reducing conveying expenses per pound waste.

According to this invention, the package is specially prepared to be collected in a special automatic central collection system, which will read an identifying bar-code marking on the package and will sort the waste according to its type, and also will provide credit to the household or commercial source of the waste as identified by the bar-code.

In general, it is the primary objective of this invention to help solving the waste disposal problem by providing affordable automatic recycling and disposal system for at least the following waste material types:

1. Recyclable materials:
   Paper types: Newspaper, Magazine paper, and cardboard.
   Glass types: Clear Glass, Green Glass, and Blue Glass.
   Aluminum: Aluminum Cans.
   Metal Cans: BI-metal Cans.
   Plastics: Plastic types 1,2,3 including Bags, Plastic Bottles of beverage,
   Plastic jags for milk, spring water, laundry, cosmetic containers, etc.
2. Non recyclable materials such as household garbage.

BRIEF DESCRIPTION OF THE DRAWINGS

The invention as herein described, by a way of example only, with reference to the accompanying drawings, wherein:

FIG. 9 is a top view of packaging bag.

FIG. 10 is a sectional view of packaging bag before being loaded in the machine.

FIG. 11 is a sectional view of packaging bag in fully extended position after being loaded in the machine.

DESCRIPTION OF THE PREFERRED EMBODIMENT

Figure 1:
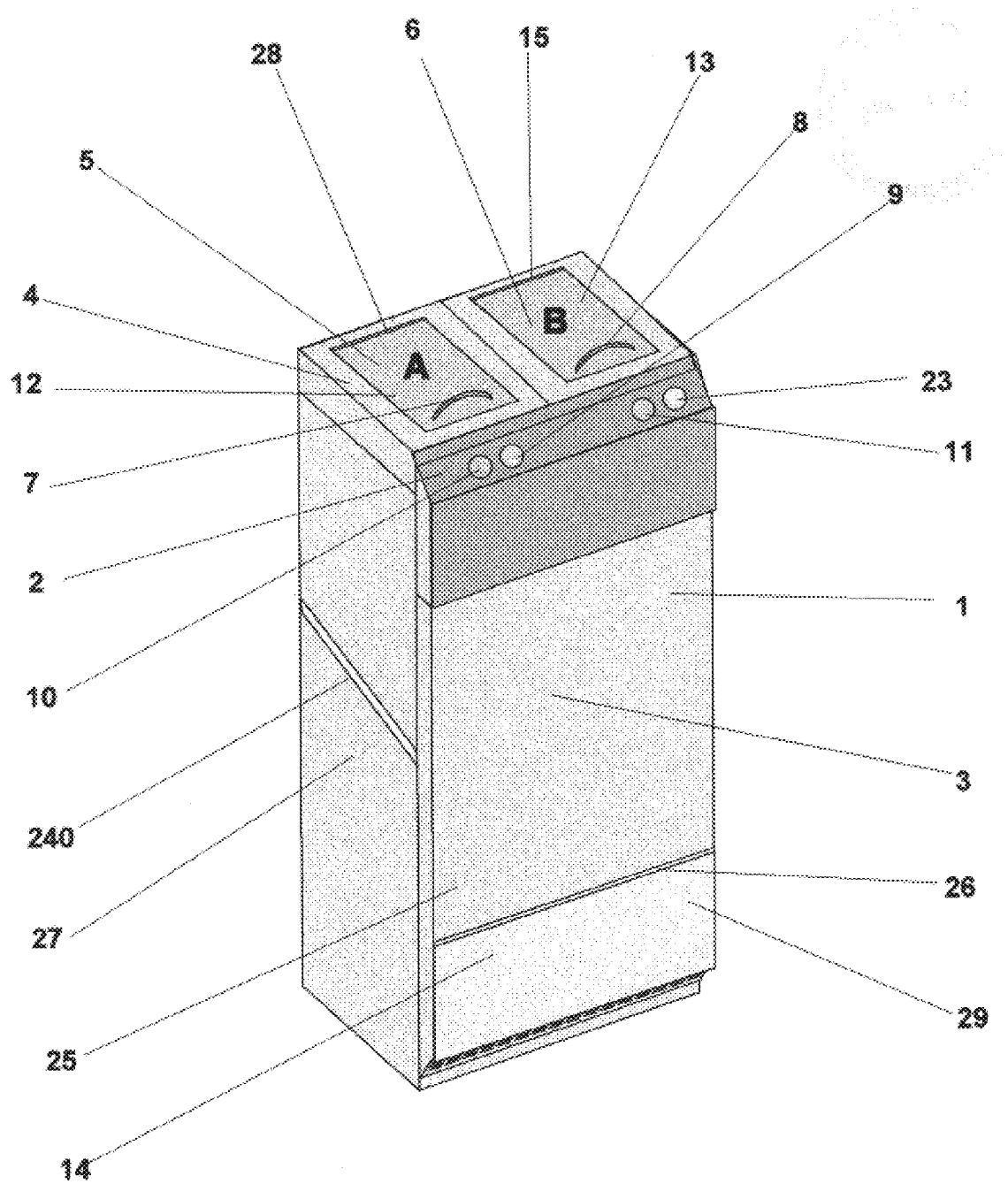
FIG. 1 is a three dimensional view of the machine.

Referring to FIG. 1, a preferred embodiment of the automatic material processing machine is shown in three-dimensional view. The machine assembly consists of main frame 1 with a cubicle shape, which resembles a configuration of an appliance such as household washer or dryer. The machine shown in FIG. 1 consists of two independent material processing compartments A and B. each compartment is allocated to one specific material type. However, the two compartments A and B are shown as example only and the machine may consists of more material processing compartments, with each compartment allocated to a specific material type.

Figure 2:
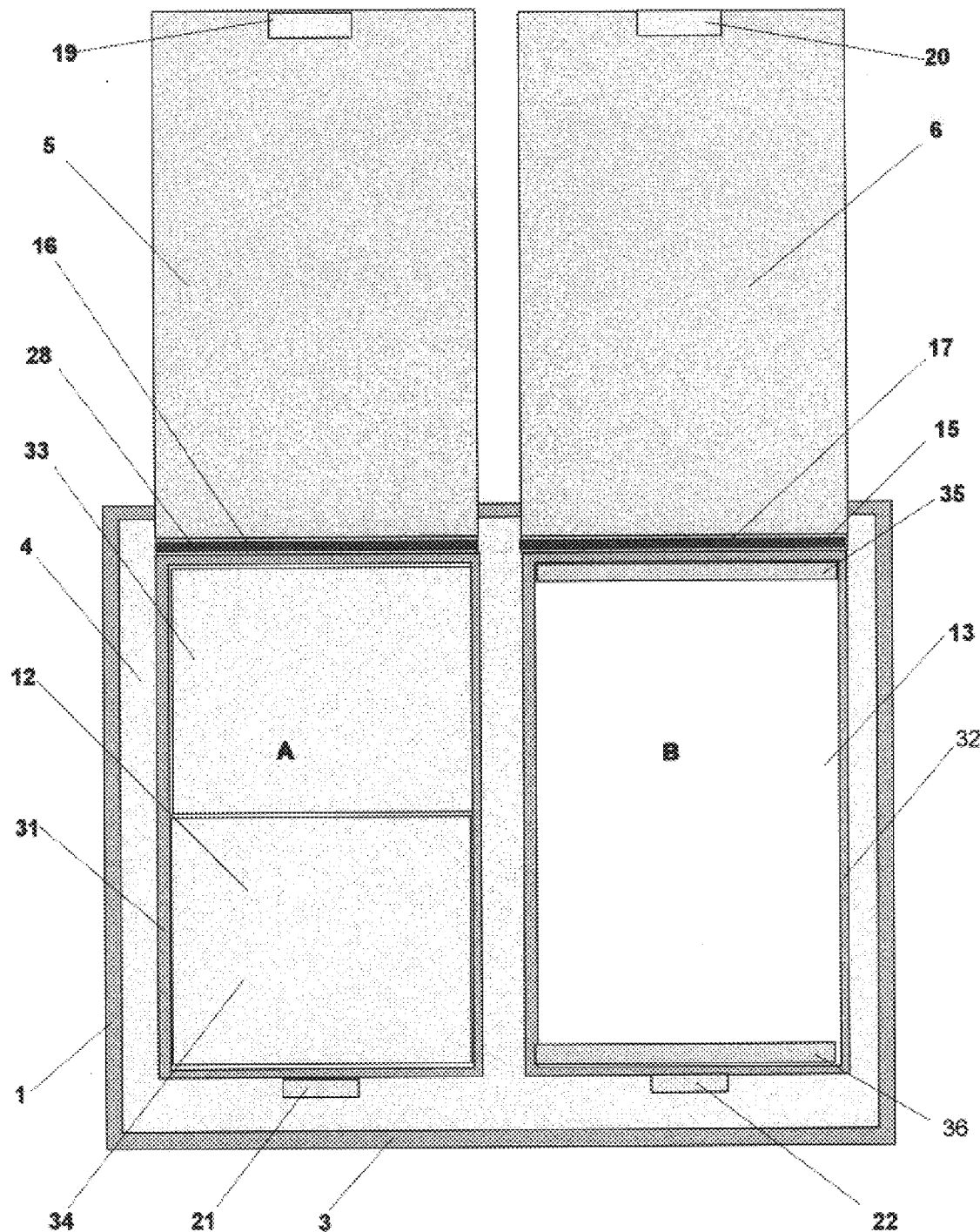
FIG. 2 is a top view of the machine.

Referring to FIG. 2, a top view of a machine with compartments A and B shown with their inlet covers at open position.

The following description relates to FIGS. 1 and 2. The material is inserted into compartments A and B through material inlet openings 12 and 13 respectively which are located in the upper panel 4. The openings 12 and 13 are provided with sealed covers 5 and 6 respectively. The covers 5 and 6 are equipped with handles 7 and 8 respectively and they are pivoted on hinges 28 and 15 respectively to upper panel 4. The normally closed position of the inlet covers 5 and 6 is controlled by torsion springs 16 and 17 respectively, which apply torque to keep the inlet covers in closed position. In addition, permanent magnet bars 19 and 20 are attached to each inlet cover respectively. The permanent magnet bars remotely operate the position indication magnetic switches 21 and 22, which are located on the top panel 4. When cover is in closed position, the magnetic field created by permanent magnet bar affects the position indicator magnetic switches to indicate closed position of the inlet cover. When inlet cover is open, the distance between the permanent magnet bar and the magnetic switch is too large to affect the switch. Located at the lower side of the front panel 3 is outlet opening 29 for processed material packages, through which packages of both compartments A and B are disposed out of the machine. The outlet opening 29 is provided with outlet cover 14. The outlet cover 14 is pivoted on horizontal hinge 25 to front panel 3. The normally closed position of the outlet cover 14 is controlled by torsion springs 26, which apply torque to keep the outlet covers in closed position. The outlet cover is opened as it is pushed outward by processed material package, which is conveyed by conveyor outside the machine. A side opening 240 located at the side panel 27 for the introduction of special packaging bag into the machine is provided for each compartment. A control panel 2 includes two control knobs 9 and 10 for compartment A and two control knobs 23 and 11 for compartment B. Knob 9 controls the electrical power to compartment A. Knob 10 controls the manual commanded compacting of the material in compartment A and disposal of sealed package from the machine. Knob 11 controls the electrical power to compartment B. Knob 23 controls the manual commanded compacting of the material in compartment B and disposal of sealed package from the machine.

Static containers 31 and 32 are rigidly attached to main frame. The outlet covers 33 & 34 of compartment A are shown in closed position, while the outlet covers 35 & 36 of compartment B are shown in open position. The material for processing in compartment A is inserted into static container 31 through top opening 12 when inlet cover 5 is in open position. The material then flows down by gravitation onto the bottom of static container 31.

Figure 3:
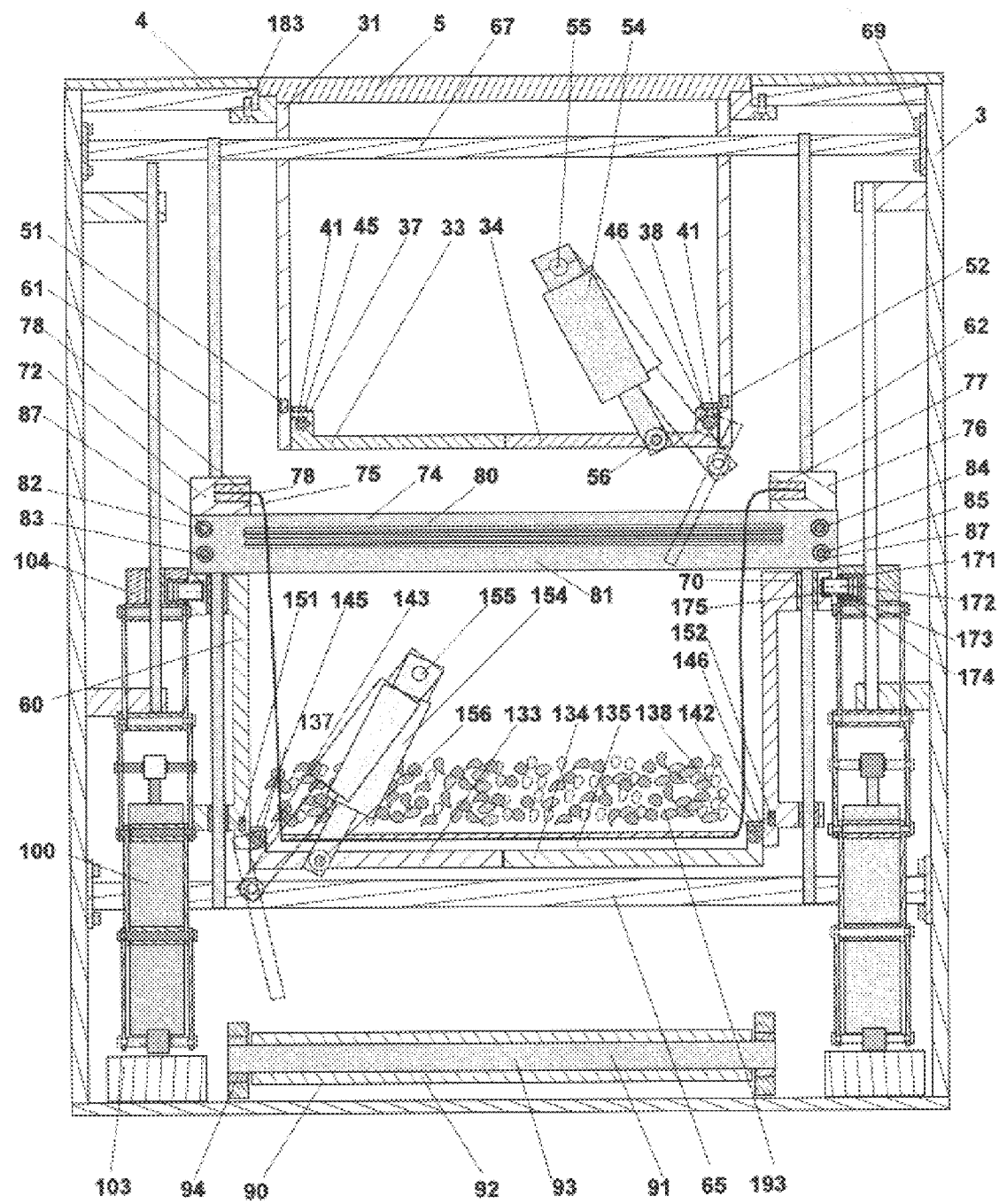
FIG. 3 is a sectional view parallel to side panel through compartment A of the machine before compacting operation.
Figure 6:
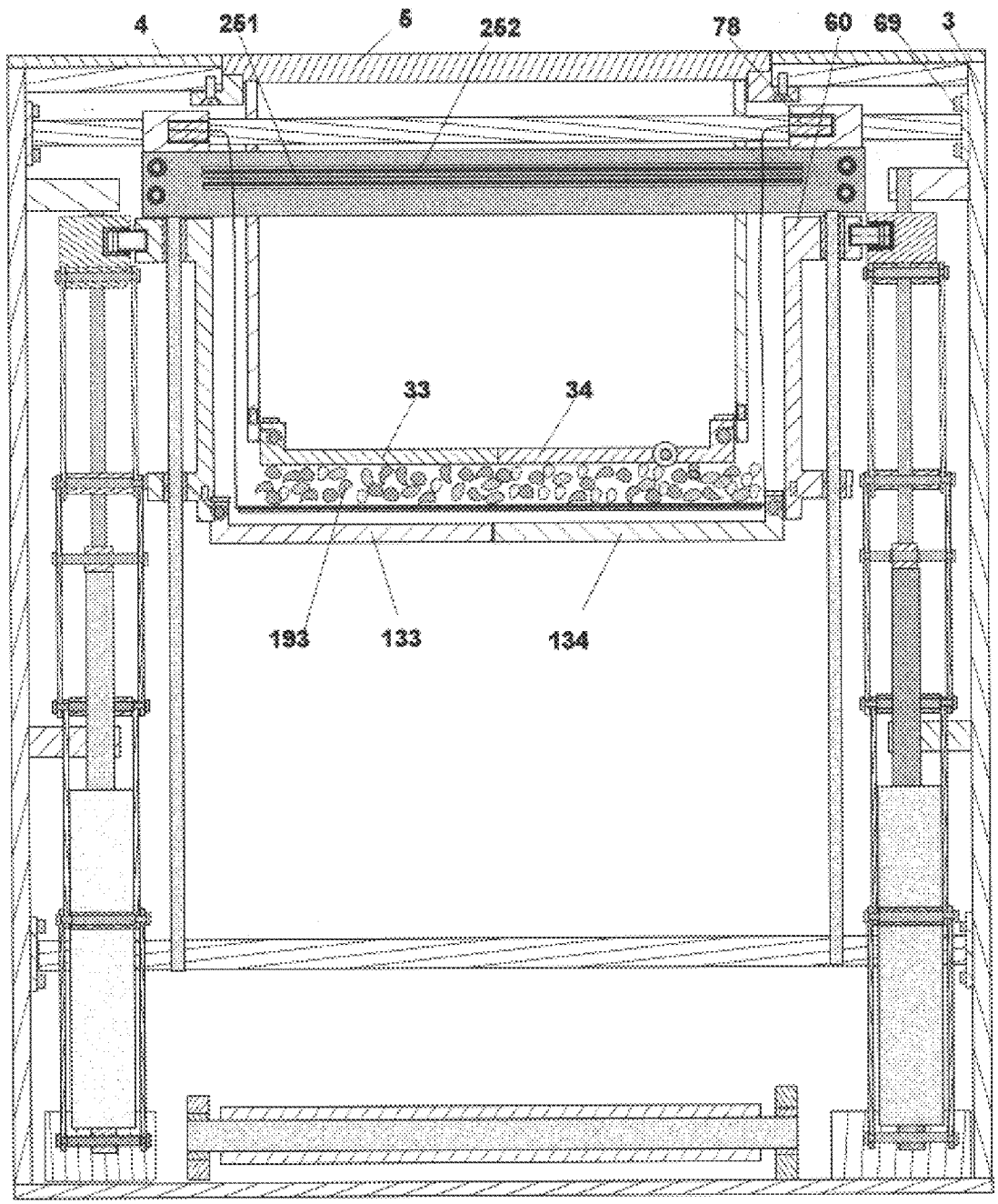
FIG. 6 is a sectional view parallel to side panel through compartment A of the machine after compacting operation.

Shown in FIG. 3 is a sectional view parallel to side panel 27 through compartment A of the machine before compacting operation. Shown in FIG. 6 is same sectional view after the compaction operation, with the pneumatic actuators of the actuation system pressurized.

Figure 4:
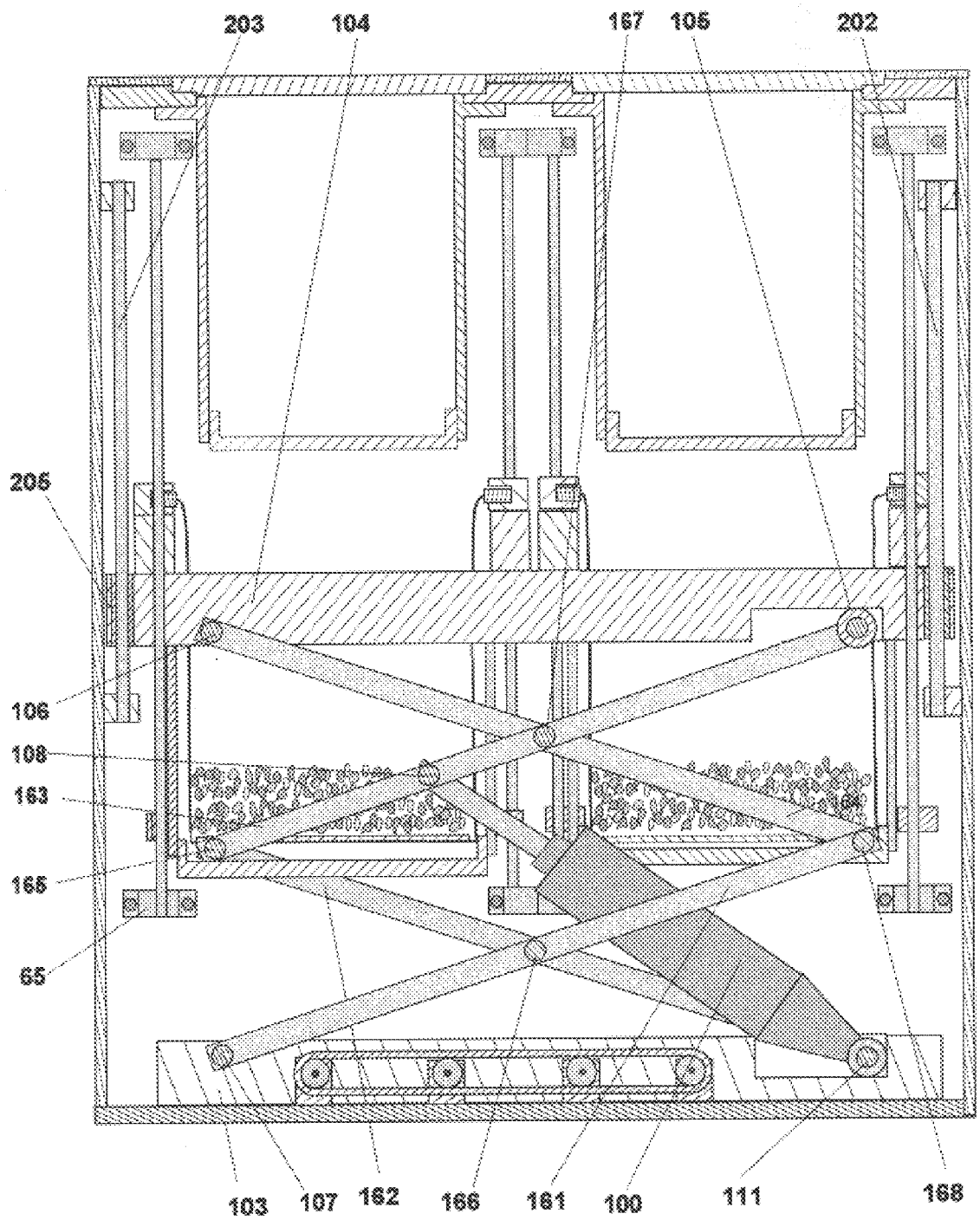
FIG. 4 is a sectional view parallel to front panel through compartment A of the machine before compacting operation.
Figure 7:
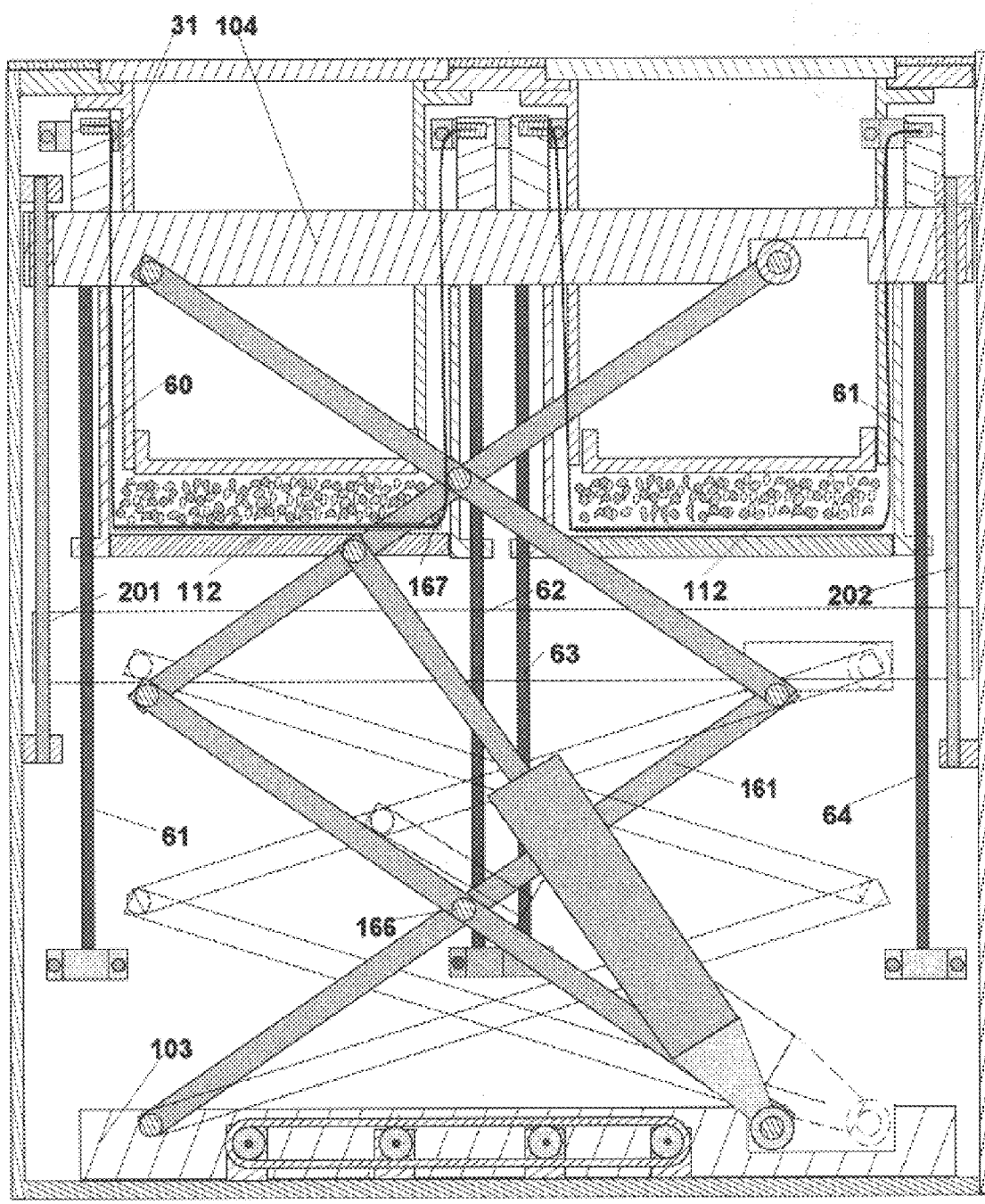
FIG. 7 is a sectional views parallel to front panel through compartment A of the machine after compacting operation.

Shown in FIG. 4 is a sectional view parallel to front panel 3 through compartment A of the machine before compacting operation. Shown in FIG. 7 is same sectional view after the compacting operation, with the pneumatic actuators of the actuation system pressurized.

Figure 5:
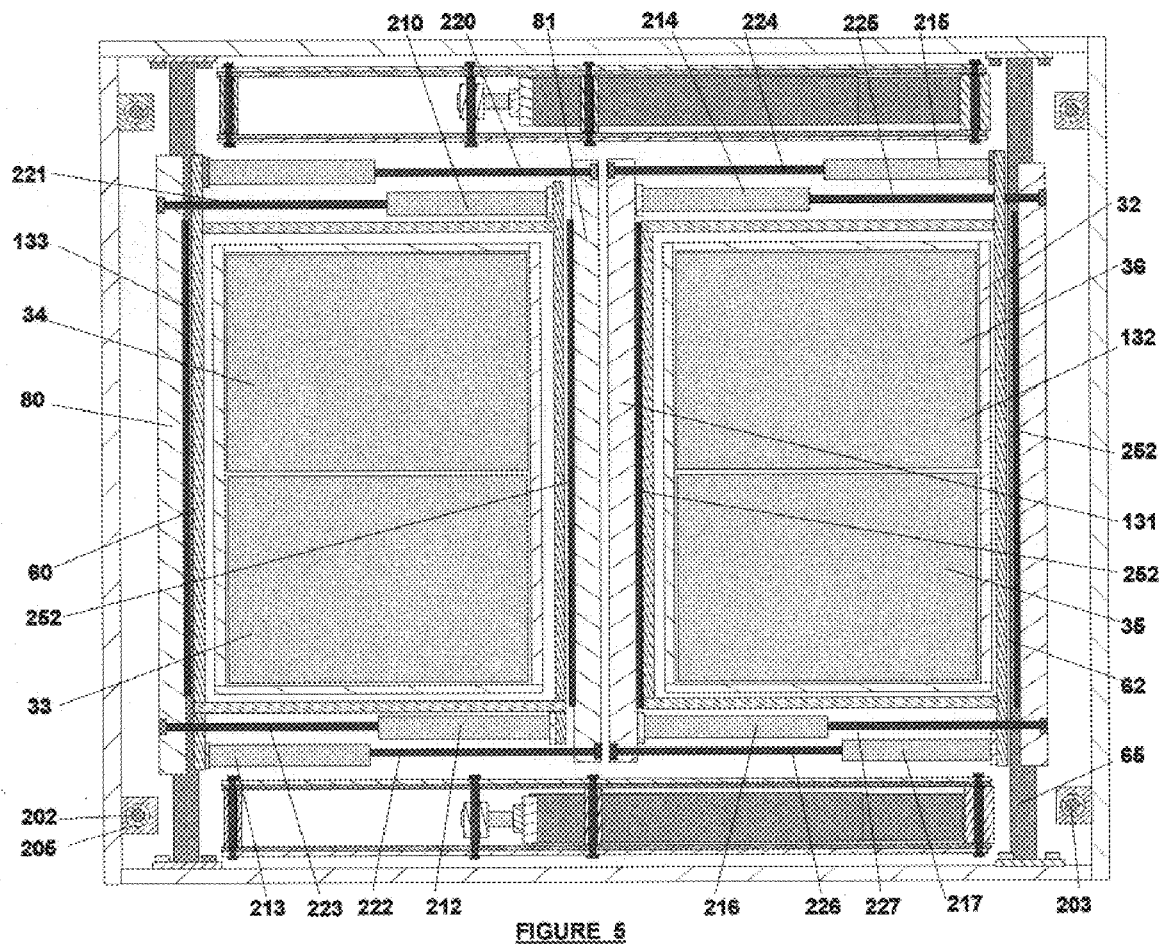
FIG. 5 is a top view of compartment A of the machine before compacting operation with the top cover removed.
Figure 8:
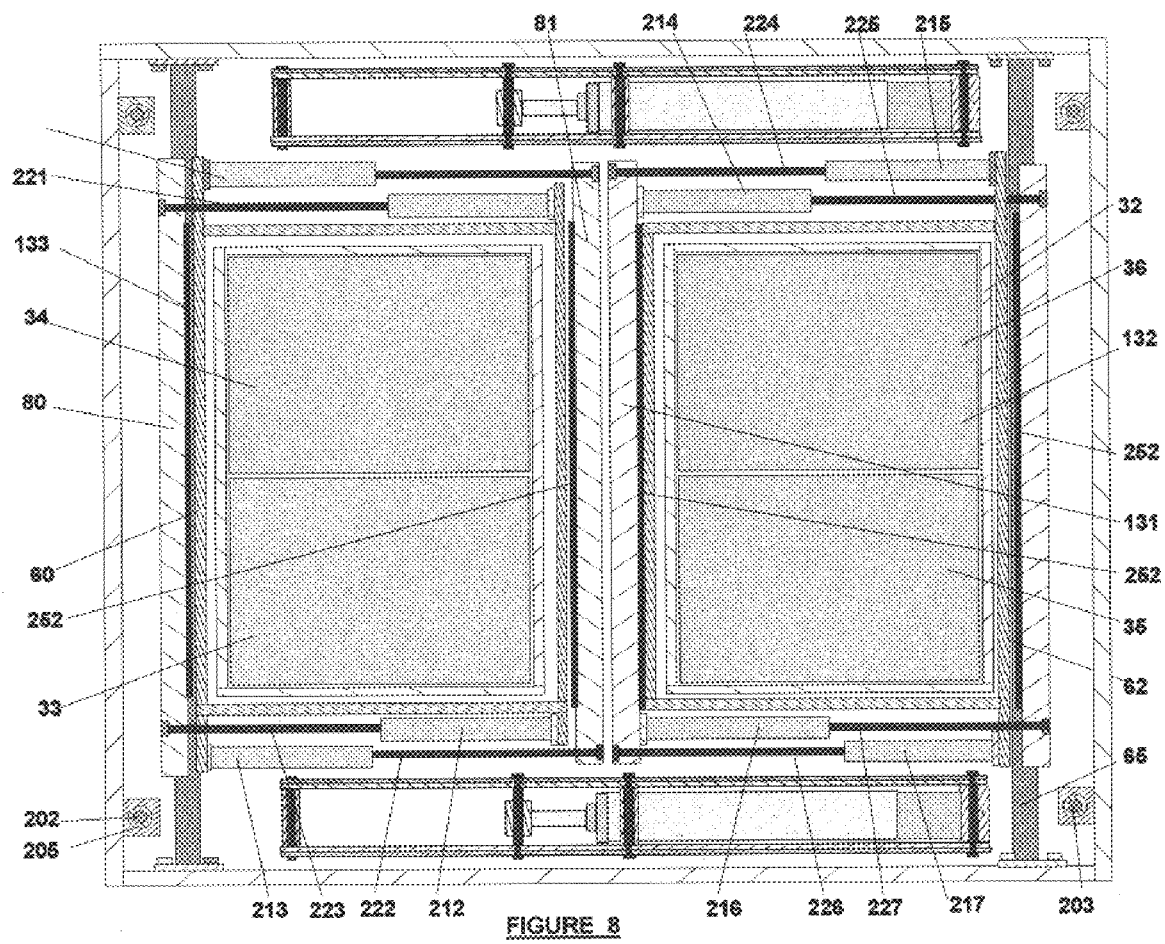
FIG. 8 is a top view of compartment A of the machine after compacting operation with the top cover removed.

Shown in FIG. 5 is a top view of compartment A of the machine before compacting operation with the top cover removed. Shown in FIG. 8 is same top view after the compacting operation, with the pneumatic actuators of the actuation system pressurized.

The following description relates to FIGS. 3, 4, 5, 6, 7, and 8. The static container 31 attached to main frame 1 with screws 183 and is provided with a two lower outlet covers 33 and 34 that cover the bottom outlet openings 49 of static container 31. The L shape construction of the bottom outlet covers 33 and 34 allows the covers to uncover the outlet cover 49 at a turning angle lower than 90 degrees, therefore allowing flow of the material from the static container downwards into dynamic container 60 by gravitation. The covers 33 and 34 are pivoted on hinges 37 and 38 to static container 31, and are opened by turning over said hinges in the outward direction.

The normally closed position of the outlet covers 33 and 34 is controlled by torsion springs 41 and 42, which apply torque to keep the outlet cover in closed position. In addition, permanent magnet bars 45 and 46 are attached to the outlet covers 33 and 34 respectively. The permanent magnet bars remotely operate the position indication magnetic switches, 51 and 52, which are located on the static container 31. When cover is in closed position, the magnetic field created by permanent magnet bar affects the position indicator magnetic switches to indicated closed position. When outlet cover is open, the distance between the permanent magnet bar and the magnetic switch is too large to affect the switch.

Pneumatic cylinder 54 is hinged to static container 31 through hinge 55, and to outlet cover 34 through hinge 56. When pressurized with compressed air, the cylinder 54 turns the outlet cover 33 to open position as shown in phantom lines in FIG. 3. With the removal of the pressure by control valve (not shown), the cylinder rod is retracted and the outlet cover 33 will turn to closed position.

Dynamic container 60 is open in its upper side to allow flow of unprocessed material 193 through the static container 31 with its outlet covers 33 and 34 open. The dynamic container 60 is provided with two bottom outlet covers 133 and 134 that when in closed position support the unprocessed material during compacting operation and when open allow the filled and sealed packaging bag moving downwards from the dynamic container through bottom outlet opening 135 onto conveyor belt. The L shape construction of the outlet covers 133 and 134 allows the covers to uncover the outlet at a turning angle lower than 90 degrees. The covers 133 and 134 are pivoted on hinges 137 and 138 to dynamic container 60, and are opened by turning over the hinges in the outward direction. The normally closed position of the outlet covers 133 and 134 is controlled by torsion springs 141 and 142, which apply torque to keep the outlet cover in closed position. In addition, permanent magnet bars 145 and 146 are attached to each one of the outlet covers. The permanent magnet bars remotely operate the position indication magnetic switches, 151 and 152, which are located on the dynamic container 60. When cover is in closed position, the magnetic field created by permanent magnet bar affects the position indicator magnetic switches to indicate closed position. When outlet cover is open, the distance between the permanent magnet bar and the magnetic switch is too large to affect the switch.

Pneumatic cylinder 154 is hinged to dynamic container 60 through hinge 155, and to outlet cover 133 through hinge 156. When pressurized with compressed air, the cylinder 154 turns the outlet cover 133 to open position as shown in phantom lines in FIG. 3. With the removal of the pressure by control valve (not shown), the cylinder rod is retracted and the outlet cover 133 will turn to closed position.

The dynamic container 60 is capable of moving in the vertical direction up and down. When dynamic container 60 moves upwards towards the static container it compacts the material 193 in the dynamic container which is locked between the dynamic container 60 and the static container outlet covers 33 and 34 in closed position.

Four pairs of co-linear low friction bearings 70 are mounted into the dynamic container 60, of which four are mounted at its upper portion and four in its lower portion. The dynamic container 60 up and down motion is guided by four vertical guiding rods 61, 62, 63 and 64 which are round and slide into the bearings 70 when the dynamic container 60 moves up and down. The vertical guiding rods are rigidly supported by lower horizontal support bars 65 and 66 and upper horizontal support bars 67 and 68. The lower and upper horizontal support bars 65, 66, 67 and 68 are rigidly attached to main frame 1 by screws 69.

Attached to dynamic container 60 is a packaging bag holder 72 which support the packaging bag frame 78 of the packaging bag 112 during the compacting and sealing processes of the material inside the bag. The packaging bag holder 72 consists of two parallel and horizontal bars 75 and 76 with horizontal and parallel slots 77 and 79 respectively, where the packaging bag frame 78 is inserted from outside through a horizontal slot 240 in the machine.

Attached to dynamic container 60 is a packaging bag sealing mechanism 74. The packaging bag sealing mechanism consists of two horizontal moving sealing bars 80 and 81 which moves relative to the dynamic container 60 towards each other to seal the filled packaging bag, and then move away from each other to release the sealed packaging bag. Each moving sealing bar 80, 81, 131, and 132 is provided with two parallel and horizontal strips of an electrical heating elements 251 and 252 respectively. When the moving sealing bars 80 and 81 of Compartment A hit each other, the packaging bag 112 resilient plastic material portion 115 is trapped between them and is heated locally by heating elements 251 to create a line seal. When energized, heating elements 252 of sealing bars 80 and 81 cut the plastic material 115 of the packaging bag 112 above the sealing line created by heating elements 251. The packaging bag is then cut and therefore separated from its frame 78.

Four pairs of co-linear low friction bearings 87 are mounted into the moving sealing bars 80 and 81 of compartment A, of which four are mounted at their upper portion and four in their lower portion. The horizontal movement of the moving sealing bars 80 and 81 towards and away of each other is guided by four horizontal guiding rods 82, 83, 84 and 85 which are round and slide into the bearings 87. The moving sealing bars are actuated by pneumatic cylinders 210, 211, 221 and 213 of Compartment A which are connected to the dynamic container 60 of Compartment A. The rod ends of these pneumatic cylinders 220, 221, 222 and 223 of Compartment A are threaded to moving sealing bars 80 and 81 of Compartment A so that when the cylinders are pressurized, the rod ends will pull the moving sealing bars towards each other to create the seal in the packaging bag and then cut the sealed packaging bag from its frame 78. Then when pressurized to move in opposite direction, the moving sealing bars will be pushed back to their original position.

Attached to bottom of main frame 1 is a conveying means 90 for conveying the sealed bags 112 out of the machine through the outlet opening 29, that consists of pivoted rollers 93, each consists of a rolling member 91 which turns over two end bearings 94. A belt 92 turning on rollers 93 which are driven by air motor 128 (not shown), carries the bag towards the outlet opening 29 which is provided with outlet cover 14 and located at the lower side of the front panel 3.

The outlet cover 14 is opened as it is pushed outward by a sealed package, which is then conveyed by conveyor outside the machine.

The dynamic container 60 is moved upwards and downwards by means two actuation systems located at front end and rear end of the machine. Shown in FIGS. 3, 4 and 5 are the actuation systems before pneumatic actuator 100 is pressurized. Shown in FIGS. 6, 7 and 8 are the actuation systems after pneumatic actuator 100 is pressurized. A pneumatic actuator 100 is pivoted to a dual scissors parallelogram mechanism which consists of identical arms 161, 162 163 and 164 which are pivoted to each other through hinges 165, 166, 167 and 168. Arm 164 of the upper side of the dual scissors parallelogram mechanism is pivoted to upper actuation bar 104 by hinge 106 with the other arm 163 consists of a roller 105 that slides relative to the upper actuation bar 104. Arm 161 of the lower side of the dual scissors parallelogram mechanism is pivoted to lower actuation bar 103 by hinge 107, while arm 162 consists of a roller 111 that slides relative to the lower actuation bar 103. Upper actuation bar 104 up and down motion is guided by two vertical guiding rods, 202 and 203, which are round and slide into the bearings 205 when the upper actuation bar moves up and down. The vertical guiding rods are rigidly supported by lower horizontal support bars 65 and 66 and upper horizontal support bars 67 and 68. The lower and upper horizontal support bars 65, 66, 67 and 68 are rigidly attached to main frame 1 by screws 69.

Pneumatic clutch 170 is used to engage the upper actuation bar to either one of the dynamic containers 60 of compartment A or B, so that only one dynamic container 60 of compartment A or B is moved upwards or downwards with the actuation system at a time. The pneumatic clutch consists of housing 171, piston 172, return spring 173, and spring retainer 174. When pressurized air is provided to the clutch 170 by a control valve (not shown), the piston 172 will be pushed to engagement with cavity 175 in the dynamic container 60 of either A or B compartments. When the pressurized air is removed, the return spring 173 will push the piston 172 to disengage from the dynamic container 60 when in position before compacting operation.

Shown in FIG. 9 is a top view of packaging bag 112. The bag is made of a rigid cardboard frame 78. Attached to the frame 114 is a resilient plastic portion 115, which is attached to a cardboard centerpiece 116. Handle 118 is provided to facilitate installation and removal from the side of the machine.

Shown in FIG. 10 is a sectional view of packaging bag 112 before being used in the machine. Paper sheets 119 are glued to the upper and lower sides of frame 116 and encapsulate the resilient plastic portion 115, which is folded underneath the cardboard centerpiece 116.

Shown in FIG. 11 is a sectional view of packaging bag 112 after being used in the machine. The plastic portion 115 is extended down with the centerpiece pulled all the way down and supported against the bottom of the moving container 60.

The bag is made of recyclable materials and is constructed with strong materials which prevent it from being torn apart due to the crushing and compacting forces acting during the compaction process. The bag is marked with bar-code sticker 117, which includes information on the waste type, and on the identification of the household or commercial.

End Of Specification

What is claimed is:

1. A machine for compacting and disposal of materials, comprising:

A. a frame defining said machine with an upper end, side end and lower end; said frame upper end having an inlet opening, whereby allowing introduction of material into said machine; said frame having an outlet opening in said side end near said lower end, whereby allowing disposal of material out of said machine;

B. a static container rigidly attached to said frame upper end; said static container having an inlet opening in upper end and an outlet opening in lower end of said static container, whereby allowing material to flow downwards from frame inlet opening into said static container and out of said static container;

C. a cover for closing said outlet opening of said static container, whereby said cover swings like a door to close and open said outlet opening;

D. a spring member urging said cover to a closed position, whereby preventing material flow out of said static container;

E. a pressurized fluid actuation means for turning said cover to uncover said material outlet opening in said static container, whereby allowing material flow downwards;

F. a dynamic container mounted below said static container, whereby material flowing down from said static container material outlet opening is collected within said dynamic container;

G. multiple guiding members to control said dynamic container reciprocal up and down motion relative to said static container;
      said static container being closely surrounded within said dynamic container at the utmost of said upper motion of said dynamic container, whereby cooperating with said dynamic container to compact material within said dynamic container, whereby material is sandwiched between said dynamic container and lower end of said static container during upward motion of said dynamic container;
      said dynamic container having an outlet opening at the lower end of said dynamic container, whereby allowing compacted material flow downwards out of said dynamic container;

H. an outlet cover for closing said outlet opening of said dynamic container; said outlet cover of said dynamic container pivotably hinged to said dynamic container, whereby said outlet cover swings like a door to close and open said material outlet opening;

I. a spring member urging said outlet cover to a closed position, whereby preventing material flow out of said dynamic container;

J. a pressurized fluid actuation means for swinging said outlet cover to uncover said opening in said dynamic container whereby allowing material flow downwards;

K. an actuation means to reciprocate said dynamic compacting container up and down relative to said static container wherein said actuation means consists of dual scissors parallelogram mechanism with a pressurized fluid actuation means hinged between lower scissors and upper scissors members, whereby when pressurized, said actuation means urge said scissors members to change angularity between said scissors members resulting with forced motion of said scissors members to reciprocate said dynamic container.

2. A machine for compacting, packaging and disposal of materials, comprising:
- A. a frame defining said machine with an upper end, side end and lower end; said frame upper end having an inlet opening, whereby allowing introduction of material into said machine; said frame having an outlet opening in said side end near said lower end, whereby allowing disposal of material out of said machine; said frame having horizontal slot in said side end;
- B. a static container rigidly attached to said frame upper end; said static container having an inlet opening in upper end and an outlet opening in lower end of said static container, whereby allowing material flow downwards from frame inlet opening into said static container and out of said static container;
- C. a cover for closing said outlet opening of said static container; said cover of said static container pivotably hinged to said static container, whereby said cover swings like a door to close and open said outlet opening;
- D. a spring member urging said cover to a closed position, whereby preventing material flow out of said static container;
- E. a pressurized fluid actuation means for turning said cover to uncover said material outlet opening in said static container, whereby allowing material flow downwards;
- F. a dynamic container mounted below said static container, whereby material flowing down from said static container material outlet opening is collected within said dynamic container;
- G. multiple guiding members to control said dynamic container reciprocal up and down motion relative to said static container;
  - said static container being closely surrounded within said dynamic container at the utmost of said upper motion of said dynamic container, whereby cooperating with said dynamic container to compact material within said dynamic container, whereby material is sandwiched between said dynamic container and lower end of said static container during upward motion of said dynamic container;
  - said dynamic container having an outlet opening at the lower end of said dynamic container, whereby allowing compacted material flow downwards out of said dynamic container;
- H. an outlet cover for closing said outlet opening of said dynamic container; said outlet cover of said dynamic container pivotably hinged to said dynamic container, whereby said outlet cover swings like a door to close and open said material outlet opening;
- I. a spring member urging said outlet cover to a closed position, whereby preventing material flow out of said dynamic container;
- J. a pressurized fluid actuation means for swinging said outlet cover to uncover said opening in said dynamic container whereby allowing material flow downwards;
- K. an actuation means to reciprocate said dynamic compacting container up and down relative to said static container;
  - said actuation means consists of dual scissors parallelogram mechanism with a pressurized fluid actuation means hinged between lower scissors and upper scissors members, whereby when pressurized, said actuation means urge said scissors members to change angularity between said scissors members resulting with forced motion of said scissors members to reciprocate said dynamic container;
- L. a packaging bag means consists of a rigid frame with hollow center and with handling means; a plastic containing means attached to said rigid frame; and a rigid centerpiece having nearly the size of the bottom of said dynamic container and attached to the center of said plastic containing means; whereby said plastic containing means and rigid centerpiece are pre-packed into said rigid frame hollow center before inserted into said machine, and said rigid centerpiece of said packaging bag means is being pushed down to seat on the bottom of said dynamic container when said dynamic container moves relative to said static container during compacting operation;
- M. a packaging bag holding means with horizontal loading slots, attached to said dynamic container upper open end; whereby said rigid frame of said packaging bag means is inserted from outside the machine through said horizontal slot in said frame side end and into said horizontal loading slots in said packaging bag holding means, such that said rigid frame of said packaging bag means is supported inside said horizontal loading slots to said dynamic container, and said centerpiece of said packaging bag means is supported on the bottom of said dynamic container, with the plastic containing means of said packaging bag means being held open and ready to collect material;
- N. a packaging bag sealing means, attached to said dynamic container upper open end below said packaging bag holding means, comprising:
  - N1. a pair of parallel moveable members horizontally guided such that they move towards each other and then away from each other, whereby said parallel moveable members slide towards each other to create a seal in the plastic containing means;
  - N2. a pair of heating element strips attached to each said parallel moveable member, whereby producing heat when energized with electrical power, for locally heating said packaging bag means along line of contact of said parallel members, for sealing said packaging bag means, and for cutting said packaging bag means above the seal line and separate the sealed plastic containing means from said rigid frame of said packaging bag means;
  - N3. a pressurized fluid actuation means for linearly moving said parallel moveable members towards each other and then away from each other.

3. A machine according to claim 2 wherein said machine having a conveyor means for conveying said packaging bag means from under said dynamic container lower end, whereby said packaging bag means is conveyed out of said machine through said outlet opening of said frame; said conveyor means comprises multiple rolling means and actuation means for turning said multiple rolling means, whereby said rolling means turning such that said packaging bag means is conveyed out of said machine through said outlet opening.

4. A machine according to claim 3 wherein said outlet opening of said frame having a cover for closure of said outlet opening of said frame;
- said cover of said outlet opening is pivotably hinged to said side end, whereby said cover swings like a door to close and open said outlet opening and it is opened toward outside of said frame; a spring member urging said cover to a closed position, whereby when said cover is pushed outwards of said machine by said packaging bag means which is conveyed by said conveyor means towards said cover, while filled with material and sealed, it will allow said packaging bag means to move outside of said machine.

5. A machine according to claim 2 wherein said inlet opening of said frame having a cover for closure of said inlet opening of said frame;

said cover of said inlet opening is pivotably hinged to said upper end of said frame, whereby said cover swings like a door to close and open said inlet opening and it is opened upward of said frame; a spring member urging said cover to a closed position, whereby said cover is opened manually for insertion of material into said static container.

6. A machine according to claim 2 wherein permanent magnet bars attached to said cover of said static container, said outlet cover of said dynamic container, and said inlet cover of said frame; and magnetic switch means attached to said static container, said dynamic container and said frame upper end respectively, whereby said magnetic switch means are actuated by the magnetic field created by said permanent magnet bars when covers are in closed position, such that output of said magnetic switch means controlling the operation of said machine.

\* \* \* \* \*